(No Model.)
G. S. CONOVER.
CAR COUPLING.
No. 273,818. Patented Mar. 13, 1883.
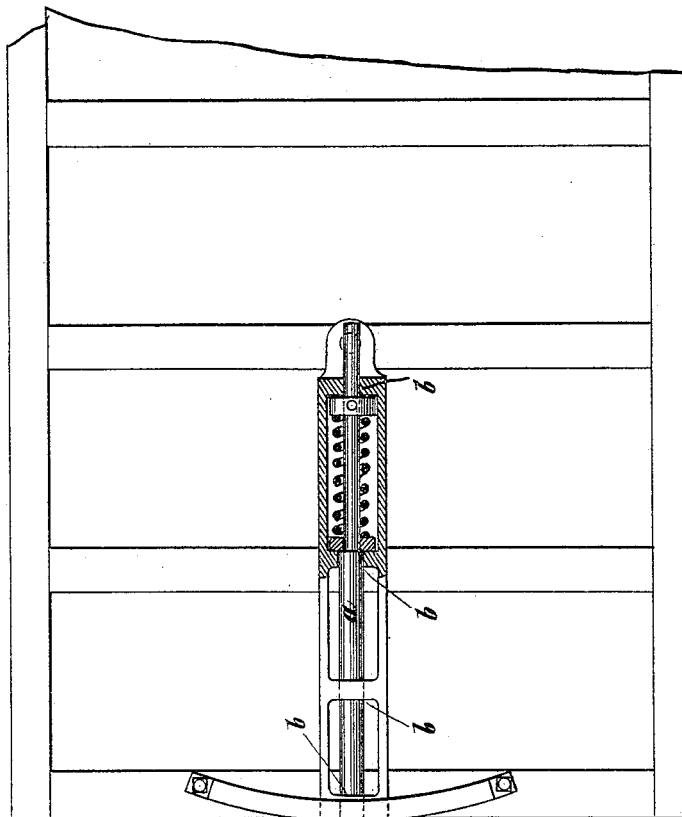
Fig.1
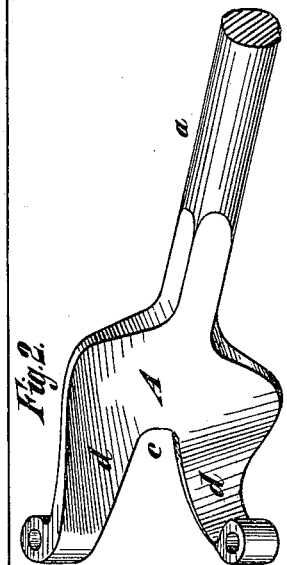
Fig.2
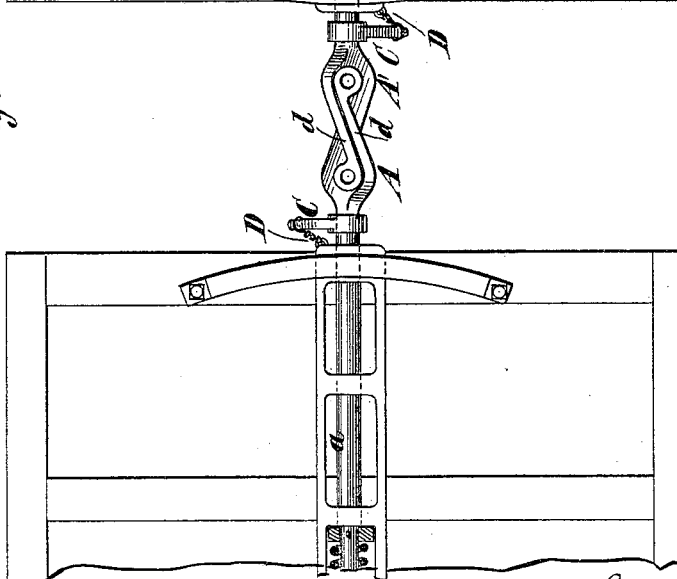
Witnesses
James R. Bowen.
Fred P. Haynes
Inventor
Gordon S. Conover
by his attorney,
Edwin H. Brown

UNITED STATES PATENT OFFICE.

GORDON S. CONOVER, OF FREEHOLD, NEW JERSEY.

CAR-COUPLING.

SPECIFICATION forming part of Letters Patent No. 273,818, dated March 13, 1883.

Application filed September 27, 1882. (No model.)

*To all whom it may concern:*

Be it known that I, GORDON S. CONOVER, of Freehold, in the county of Monmouth and State of New Jersey, have invented a certain new and useful Improvement in Car-Couplings, of which the following is a specification.

My improvement consists in the combination, in a car-coupling, of a shank capable of being turned, and two clutch-pieces having their salient faces extending in opposite directions, arranged at acute angles to the axis of the shank, and diverging outward to their extremity, and adapted to engage with corresponding clutch-pieces of an adjacent coupling. The ends of these clutch-pieces are preferably rounded or turned back, to facilitate passing by the ends of the clutch-pieces of an adjacent coupling.

In the accompanying drawings, Figure 1 is an inverted plan of two united coupling-pieces embodying my improvement, and also their draw-bars and bearings on cars to which they are applied; and Fig. 2 is a perspective view of one of the couplings detached.

Similar letters of reference designate corresponding parts in both figures.

A A' designate the two coupling-pieces. Each has a shank, $a$, which is rounded transversely, and fits in bearings $b$, attached to the draw-bar of a car. Near the rear end of the draw-bar a collar is combined with the shank $a$ by means of a pin fixed in the collar and working in a slot in the shank, or otherwise, so that when the shank is pushed inward it can move through the collar, but so that when the shank is pulled outward the collar will move with it. A spring is arranged between the aforesaid collar and a second collar which fits against a shoulder on the shank $a$, and this spring serves to resist the movement of the shank in either longitudinal direction. The shank $a$ is free to turn or rotate in its bearings $b$. Moreover, it is free to swing laterally in the outer bearing to accommodate itself to the car while the latter passes around curves. From this shank extend two clutch-pieces, $d\,d$, which have their salient faces extending in opposite directions and at acute angles to the axis of the shank. At the extreme ends they are rounded or turned back, so that when they strike the ends of the corresponding clutch-pieces of an adjacent coupling there will be a tendency to turn them aside to facilitate their passing by. Between the clutch-pieces is a stop or buffer, $c$, which, when the car is run toward another to be coupled thereto, will strike against the corresponding stop or buffer of the other car. The springs applied to the shanks of the couplings gradually reduce the force of the concussion which then occurs. It will be seen that the opposite edges of the clutch-pieces are both inclined and diverge outwardly to their extremities. This is advantageous, in that it facilitates the engagement of the couplings arranged on cars at different levels, as one can ride up on the other. The couplings are provided with levers C, whereby they may be turned or rotated. The levers C are heavy enough or are weighted heavily enough to keep the couplings in a position ready for engagement with another coupling; hence after adjustment no further care need be given to the coupling for the time being. The levers C may be secured in position by chains D, or other devices connecting them to the draw-bars, so as to retain the coupling-pieces in position to engage with others.

When two cars are to be connected the coupling of one car is turned to one side, so that its clutch-pieces will not be obtruded in the way of the clutch-pieces of the coupling of the other car. The coupling of the other car will be retained in the reverse position by means of the lever C and its fastening. When the two couplings come together the coupling which was shifted aside is turned in the reverse direction by means of its lever, and the lever is fastened. The clutch-pieces of the two couplings then hug one another and the cars are connected. The stops or buffers $c$ are so arranged that they afford considerable play between the couplings—that is, they allow of the couplings moving closer together longitudinally than they are while one car is being drawn by the other. This enables the operation of the couplings to assimilate to the operation of ordinary couplings and links so far as longitudinal play is concerned. The backs of the ends of the clutch-pieces in these couplings are made to form eyes capable of receiving a bolt or pin such as is used to secure to couplings ordinarily in use the links which are employed in conjunction therewith. Thus provision is afforded for connecting my improved couplings with the couplings which are ordinarily used. In using my improved coupling with one of the ordinary couplings the end portions of its clutch-pieces will serve as a buffer.

The draw-bars to which my couplings are applied will preferably be made susceptible of an up-and-down movement, as usual. The shanks of my couplings may be made susceptible of turning or rotating entirely round, to facilitate engaging their clutch-pieces with their fellows.

It is obvious that if cars connected by my coupling should turn over in certain directions sidewise the couplings will become disengaged.

What I claim as my invention, and desire to secure by Letters Patent, is—

1. The combination, in a car-coupling, of a shank capable of being turned, and two clutch-pieces having their salient faces extending in opposite directions, arranged at acute angles to the axis of the shank, and diverging outward to their extremity, and adapted to engage with corresponding clutch-pieces of an adjacent coupling, substantially as specified.

2. The combination, in a car-coupling, of a shank capable of being turned, and two clutch-pieces, having their salient faces extending in opposite directions, arranged at acute angles to the shank, and diverging outward to their extremity, and adapted to engage with corresponding clutch-pieces of an adjacent coupling, the ends of said clutch-pieces being rounded or turned back to facilitate passing by the ends of said corresponding clutch-pieces, substantially as specified.

GORDON S. CONOVER.

Witnesses:
  FREDK. HAYNES,
  JAMES R. BOWEN.